US012715047B2

(12) United States Patent
Tanaka et al.

(10) Patent No.: US 12,715,047 B2
(45) Date of Patent: Aug. 25, 2026

(54) INSERT AND CUTTING TOOL PROVIDED THEREWITH

(71) Applicant: KYOCERA CORPORATION, Kyoto (JP)

(72) Inventors: Ayano Tanaka, Satsumasendai (JP); Ryoma Nomiyama, Satsumasendai (JP); Yuichiro Kuma, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 812 days.

(21) Appl. No.: 17/911,652

(22) PCT Filed: Mar. 25, 2021

(86) PCT No.: PCT/JP2021/012713

§ 371 (c)(1),
(2) Date: Sep. 15, 2022

(87) PCT Pub. No.: WO2021/193868

PCT Pub. Date: Sep. 30, 2021

(65) Prior Publication Data

US 2023/0142263 A1 May 11, 2023

(30) Foreign Application Priority Data

Mar. 25, 2020 (JP) ................................ 2020-054518

(51) Int. Cl.
*B23B 27/16* (2006.01)

(52) U.S. Cl.
CPC ................................ *B23B 27/1611* (2013.01)

(58) Field of Classification Search
CPC .......... B22F 2003/242; B22F 2005/001; B22F 2201/02; B22F 2201/11; B22F 2201/20;
(Continued)

(56) References Cited

U.S. PATENT DOCUMENTS 5,518,822 A * 5/1996 Teruuchi ................ C22C 29/04 428/568
8,007,561 B2 * 8/2011 Shindo ................... C22C 27/04 75/238

(Continued)

FOREIGN PATENT DOCUMENTS

CN 108698135 A 10/2018
DE 4435265 A1 4/1996

(Continued)

OTHER PUBLICATIONS

Hiroyuki Hosokawa, "Research and development on high toughness of Ti(C, N)-Ni based cermet", Structural Materials Research Department of the National Institute of Advanced Industrial Science and Technology (2012 General Research and Development Support AF-2012004), 12pp.

*Primary Examiner* — Lynda Salvatore
(74) *Attorney, Agent, or Firm* — HAUPTMAN HAM, LLP

(57) ABSTRACT

A cermet, as a base, containing a plurality of hard particles and a bonded phase between the plurality of hard particles. Each of the plurality of hard particles, when viewed in cross section, includes a first region containing Ti, N, and C, and contains a titanium carbonitride phase as a main constituent. Each of the plurality of hard particles, when viewed in cross-section, includes a second region containing one or more metal elements selected from the group consisting of V, Nb, Ta, Cr, Mo, W, Co, and Ni in a larger amount than the first region. The content of the one or more metal elements in the second region is 9.5 mass % or more in a total amount. A cutting tool has a length extending from a first end to a second end, and includes a holder and the insert described above.

14 Claims, 3 Drawing Sheets

(58) Field of Classification Search

CPC .... B22F 2998/10; B22F 2999/00; B22F 3/02; B22F 3/1017; B22F 3/14; B22F 9/026; B22F 27/1611; B22F 7/00; C22C 1/051; C22C 29/005; C22C 29/04; C22C 1/05; B61D 17/06; E05C 17/02; H01M 10/0468; H01M 10/658; H01M 50/204; H01M 50/24; H01M 50/502; B23B 27/16; B23B 27/14

See application file for complete search history.

(56) References Cited

U.S. PATENT DOCUMENTS

| | | | |
|---|---|---|---|
| 2016/0130687 | A1 | 5/2016 | Yamanishi et al. |
| 2019/0061011 | A1 | 2/2019 | Nomiyama et al. |

FOREIGN PATENT DOCUMENTS

| | | | |
|---|---|---|---|
| EP | 1892051 | A1 | 2/2008 |
| JP | 2004292842 | A | 10/2004 |
| JP | 2006346776 | A | 12/2006 |
| JP | 5807851 | B1 | 11/2015 |
| JP | 201865227 | A | 4/2018 |
| WO | 2006134936 | A1 | 12/2006 |

* cited by examiner

INSERT AND CUTTING TOOL PROVIDED THEREWITH

RELATED APPLICATIONS

The present application is a National Phase of International Application Number PCT/JP2021/012713 filed Mar. 25, 2021, and claims priority of Japanese Application Number 2020-054518 filed Mar. 25, 2020.

TECHNICAL FIELD

The present disclosure relates to an insert and a cutting tool provided therewith.

BACKGROUND OF INVENTION

Cermets containing titanium (Ti) as a main constituent have been widely used as a base of a member requiring wear resistance, slidability, and chipping resistance for a cutting tool and the like.

CITATION LIST

Patent Literature

Patent Document 1: JP 2004-292842 A

Non-Patent Literature

Non-Patent Document 1: Hiroyuki Hosokawa "Research and development on high toughness of Ti(C, N)—Ni based cermet", Structural Materials Research Department of the National Institute of Advanced Industrial Science and Technology (2012 General Research and Development Support AF-2012004)

SUMMARY

An insert of the present disclosure includes a cermet, as a base, containing a plurality of hard particles and a bonded phase located between the plurality of hard particles. Each of the plurality of hard particles, when viewed in cross section, includes a first region containing Ti, N, and C and containing, as a main constituent, a titanium carbonitride phase. Each of the plurality of hard particles, when viewed in cross-section, includes a second region containing one or more metal elements selected from the group consisting of V, Nb, Ta, Cr, Mo, W, Co, and Ni in a larger amount than the first region. The content of the one or more metal elements in the second region is 9.5 mass % or more in a total amount.

A cutting tool according to the present disclosure has a length extending from a first end to a second end, and includes a holder and the insert described above. The holder includes a pocket located closer to the first end side. The insert is located in the pocket.

DESCRIPTION OF EMBODIMENTS

Figure 1:
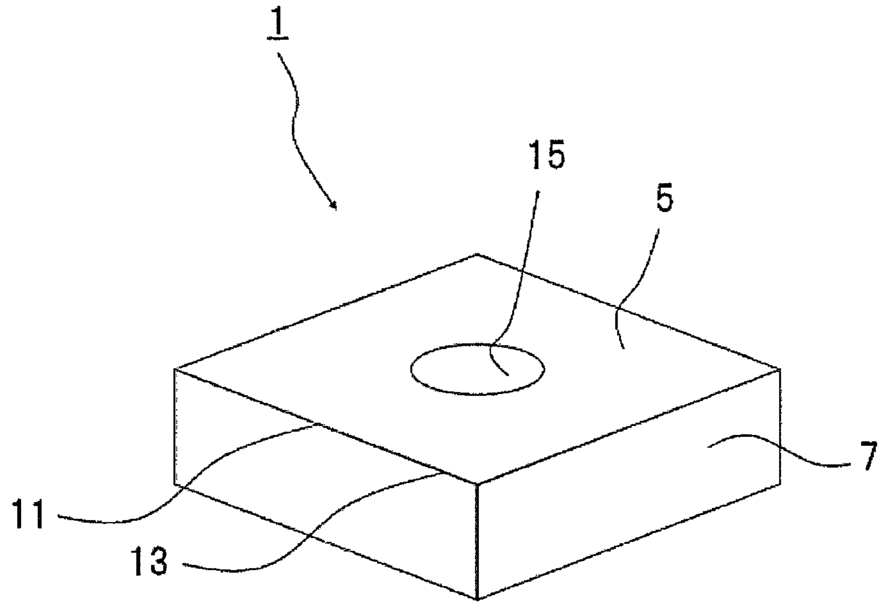
FIG. 1 is a perspective view illustrating an example of an insert according to a present disclosure.

A cermet contains TiCN particles. The cermet also contains elements such as W and Nb. A TiCN powder used as a raw material for such a cermet may have continuous dislocations, defects, grain boundaries, and the like inside the TiCN particles depending on the manufacturing method. In this specification, the dislocations, the defects, the grain boundaries, and the like present inside the TiCN particles are collectively designated as dislocations. For example, the dislocations are present in the TiCN particles constituting the TiCN powder manufactured by subjecting a grinding step. In a case where the TiCN particles having such dislocations are used, W may move to the dislocations in the firing step, and a region containing a large amount of W may be present inside the TiCN particles. Such a cermet including the region containing a large amount of W inside the TiCN particles is superior in fracture resistance. The cermet having such a structure has been in circulation in 2000 at the latest. For example, Patent Document 1 describes that the TiCN powder is pre-ground and then mixed with a WC powder or the like. However, fracture resistance of the cermet is not sufficient, and Non-Patent Document 1 describes that the cermet is hardly used as, for example, a metal mold, and the reason for this is that fracture toughness of the cermet is low.

The present disclosure provides an insert superior in fracture resistance and a cutting tool provided with the insert.

Insert

The insert of the present disclosure includes, as a base, a cermet containing a plurality of hard particles and a bonded phase located between the plurality of hard particles. Each of the plurality of hard particles is, for example, TiCN, TiC, TiN, or (TiM)CN, where M is one or more selected from the group consisting of W, Nb, Ta, Mo, V. The bonded phase contains an iron group metal such as Ni and Co as a main constituent. Note that the main constituent includes 50.0 mass % or more of constituent components.

The hard particle, when viewed in cross section, includes a first region and a second region. The first region contains Ti, N, and C, and contains a titanium carbonitride phase as the main constituent. The second region contains one or more metal elements selected from the group consisting of V, Nb, Ta, Cr, Mo, W, Co, and Ni in a larger amount than the first region. Furthermore, the content of the metal elements in the second region is 9.5 mass % or more in a total amount. An insert having such a configuration has high fracture resistance. In the following, the content of the metal elements in the second region may also be abbreviated to the total amount of the metal elements.

The insert according to the present disclosure will be described below in detail with reference to the drawings. However, each of the figures referred to below is a simplified representation of only main members necessary for description of the embodiments. Thus, the insert according to the present disclosure may include any constituent member not illustrated in each of the figures referred to. The dimensions of the members in the drawings do not faithfully represent the actual dimensions of the constituent members, the dimension ratios of the members, or the like. The above-described points are similarly applied to a cutting tool described later.

The insert of the present disclosure includes the above-described cermet as the base. As illustrated in FIG. 1, an insert 1 according to the present disclosure may have a quadrilateral plate shape. A first surface 5, which is an upper surface in FIG. 1, is a so-called rake face. The insert 1 includes a second surface 7, which is a side surface connected to the first surface 5.

The insert 1 includes a third surface (not illustrated), which is a lower surface located opposite the first surface 5. The second surface 7 is connected to each of the first surface 5 and the third surface.

The insert 1 according to the present disclosure includes a cutting edge 13 located on at least a part of a ridge line 11 where the first surface 5 and the second surface 7 intersect. In other words, the insert 1 of the present disclosure includes the cutting edge 13 located on at least part of the ridge line 11 where the rake face and the flank face intersect.

In the insert 1, the entirety of an outer periphery of the first surface 5 may be the cutting edge 13, but the insert 1 is not limited to such a configuration. For example, the insert 1 may include the cutting edge 13 on only one side or a part of the rectangular rake face.

The insert 1 of the present disclosure may include a through hole 15 penetrating through a base 3 from the first surface 5 to the third surface.

Figure 2:
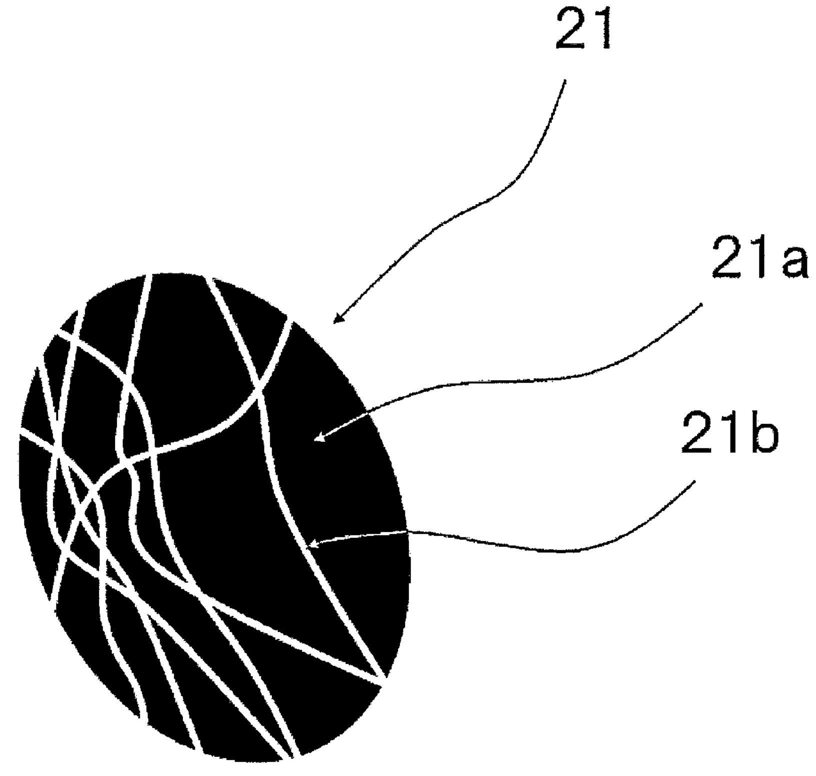
FIG. 2 is a schematic cross-sectional view of a hard particle illustrating an example of the insert according to the present disclosure.

FIG. 2 illustrates a schematic cross-sectional view of a hard particle 21 in the insert 1 of the present disclosure. The cross-section of the hard particle 21 may be preferably observed using TEM photography. The hard particle 21 includes a first region 21*a* and a second region 21*b*. In FIG. 2, a part indicated in black is the first region 21*a*. In FIG. 2, a part indicated in white located in a wire shape in the hard particle 21 is the second region 21*b*.

In the TEM observation, the first region 21*a* and the second region 21*b* can be confirmed at a magnification factor, for example, from 100,000 times to 500,000 times. Note that the magnification factor may be preferably adjusted as appropriate in accordance with the size of the hard particle 21.

The hard particle 21 in the insert 1 of the present disclosure will be described below. For example, the hard particle 21 includes the first region 21*a* containing Ti, N, and C, and containing the titanium carbonitride phase as the main constituent. The hard particle 21 includes the second region 21*b* containing one or more of metal elements selected from the group consisting of V, Nb, Ta, Cr, Mo, W, Co, and Ni in a larger amount than the first region 21*a*. The first region 21*a* occupies a majority of the hard particles 21. The first region 21*a* may be referred to as a matrix part. The second region 21*b* is present in such manner that the second region 21*b* is surrounded by the first regions 21*a* in the hard particle 21. In the cross-sectional view, the second regions 21*b* are located in a wire shape or in a mesh shape. Furthermore, the content of the metal elements in the second region 21*b* of the insert 1 according to the present disclosure is 9.5 mass % or more in the total amount. The insert 1 having such a configuration is superior in fracture resistance.

The insert 1 of the present disclosure may contain Nb in the second region 21*b*. The content of Nb in the second region 21*b* may be 2.5 mass % or more. The insert 1 having such a configuration is superior in fracture resistance.

The insert 1 of the present disclosure may contain V in the second region 21*b*. The content of V in the second region 21*b* may be 1.0 mass % or more. The insert 1 having such a configuration is superior in fracture resistance.

A cermet in the insert 1 of the present disclosure may contain Ni and Co of 14.0 mass % or more and 22.0 mass % or less in the total amount. The cermet having such a configuration has high toughness and high hardness.

The cermet in the insert 1 of the present disclosure may have fracture toughness of 10.0 $MPa \cdot m^{0.5}$ or more. The insert 1 having such a configuration is particularly superior in fracture resistance.

The cermet in the insert 1 of the present disclosure may have Vickers hardness of HV1400 or more. The cermet having such a configuration is particularly superior in wear resistance. Note that the hardness is measured using Vickers hardness under condition of a load of 196 N.

The insert 1 of the present disclosure may include a coating layer (not illustrated) on the base formed of the cermet. The coating layer may contain, for example, cubic crystals. The cubic crystals include, for example, AlTiN or TiN. The coating layer may be formed by, for example, PVD method. The coating layer may be formed by CVD method. The coating layer may be a single layer or include a plurality of the layers.

A size of the insert 1 is not particularly limited but, for example, a length of one side of the rake face is set to about from 3 mm to 20 mm. A thickness of the insert 1 is set to, for example, about from 1 mm to 20 mm. In FIG. 1, the insert 1 having a quadrangular shape is exemplified, but the insert 1 may have a triangular shape or a disk shape, for example.

Method for Manufacturing Insert

An example of a method for manufacturing the insert of the present disclosure will be described below.

In the manufacturing of the insert of the present disclosure, the TiCN powder is utilized. As a raw material powder of the TiCN, those generally used in the manufacturing of the cermet may be used. The raw material powder of TiCN may have already been subjected to the grinding step. In a case where the raw material powder of TiCN has not been subjected to the grinding step, the raw material powder is preferably ground using a rotary mill and media.

When the raw material powder of TiCN has been subjected to the grinding step, the dislocations are generated inside the raw material powder of TiCN, and one or more of metal elements selected from the group consisting of V, Nb, Ta, Cr, Mo, W, Co, and Ni move to positions where the dislocations are present.

It is preferable to use the raw material powder of TiCN having such dislocations, carbides of the above-described metals, and Co or Ni serving as the bonded phase as raw materials.

The bonded phase constituent such as Co or Ni may be from 14.0 mass % to 22.0 mass %, with the raw material powder of TiCN having the dislocations used. When the bonded phase constituent is within the above range, the cermet serving as the base has high toughness and high hardness.

The blending composition of the base may contain from 40.0 mass % to 60.0 mass % of TiCN as the plurality of hard particles, and may contain from 14.0 mass % to 22.0 mass % of Co or Ni in the total amount as the bonded phase, for example. The balance may be one or more selected from the group consisting of WC, TaC, NbC, $Mo_2C$, VC, and ZrC.

WC may be contained in an amount from 10.0 mass % to 25.0 mass %. NbC may be contained in an amount from 1.0 mass % to 15.0 mass %. VC may be contained in an amount from 0.5 mass % to 10.0 mass %.

Note that as a constituent containing V, Nb, Ta, Cr, Mo, or W, a carbide of the corresponding metal element is preferably used.

When a raw material having such a composition is used, the amount of C in the raw material at the time of blending may be from 6.5 mass % to 7.5 mass %. The amount of C at the time of blending described here is the mass % calculated by dividing mass of C contained in the entirety of the raw material composition by mass of the entirety of the composition. C at the time of blending includes not only C added as carbon but also C contained in carbides used as the raw material. That is, in order to increase the amount of C at the time of blending, the amount of C to be added may be adjusted. Examples of the added C include carbon black. In order to reduce the amount of C at the time of the blending, some or all of the raw material exemplified as the carbides may be added as metals, not as the carbides. When the amount of C in the raw material is 6.5 mass % or less, an embrittled phase may be produced. When the amount of C in the raw material is 7.5 mass % or more, a solid solution amount of the metal component in the bonded phase is reduced, and a metal-rich phase in the TiCN phase is likely to be less than 9.5 mass %.

A compound containing Nb may be used as the raw material powder. Examples of the compound containing Nb include NbC. When NbC is used as the raw material, and 8.0 mass % to 15.0 mass % of NbC and 6.5 mass % to 7.0 mass % of C are compounded in a blending composition, Nb is likely to be contained in the second region.

A compound containing V may be used as the raw material powder. Examples of the compound containing V include VC. When VC is used as the raw material, and 2.0 mass % to 10.0 mass % of VC and 6.5 mass % to 7.0 mass % of C are compounded in a blending composition, V is likely to be contained in the second region.

Raw materials having the composition described above are mixed and then fired. The firing step may be, for example, the following steps.

(a) Step of raising the temperature from room temperature to 1100° C. in vacuum (b) Step of holding at 1100° C. for 1.0 hour to 2.5 hours in vacuum (c) Step of introducing $N_2$ gas in a firing furnace at 1100° C., changing a pressure in the firing furnace to a pressure P1 that is from 500 Pa to 3000 Pa, and then raising the temperature from 1100° C. to a temperature T1 that is from 1150° C. to 1300° C. at a rate of temperature rise r1 that is from 0.1° C./min to 2° C./min (d) Step of holding for 0.5 hour to 2.0 hours at the temperature T1

(e) Step of changing the pressure in the firing furnace to a pressure P2 that is from 300 Pa to 2000 Pa and that is lower than the pressure P1 at the temperature T1, and then raising the temperature from the temperature T1 to a temperature T2 that is from 1300° C. to 1450° C. at a rate of temperature rise r2 that is from 1.0° C./min to 5.0° C./min (f) Step of holding for 0.25 hour to 1.5 hours at the temperature T2

(g) Step of changing a pressure in the firing furnace to a pressure P3 that is from 30 Pa to 1000 Pa and that is lower than the pressure P2, and then raising the temperature from the temperature T2 to a temperature T3 that is from 1450° C. to 1600° C. at a rate of temperature rise r3 that is from 2.0° C./min to 10.0° C./min (h) Step of holding for 0.1 hour to 1.0 hour at the temperature T3

(i) Step of changing to an Ar gas atmosphere at a pressure P4 that is from 100000 Pa to 800000 Pa while lowering the temperature from the temperature T3 to a temperature T4 that is 100° C. or less at a rate of temperature decline r4 that is from 10° C./min to 50° C./min The powder compact having the composition described above is fired in the above-described firing steps to produce the cermet used in the insert of the present disclosure.

Thereafter, as necessary, the coating layer (not illustrated) may be provided. The coating layer may be a so-called hard film, and may be formed by, for example, the PVD method or the CVD method. The coating film may be a single layer or laminated films.

As the coating film, a known material such as TiN, TiCN, TiCNO, $Al_2O_3$, and TiAlN can be used. A coating film of materials other than the examples described above may be used.

A bonded phase rich layer may be present in a region other than the through hole, for example, the first surface, the second surface, and the third surface at a time after firing, but the bonded phase rich layer may be removed if necessary.

Cutting Tool

Next, the cutting tool according to the present embodiment will be described with reference to the drawings.

Figure 3:
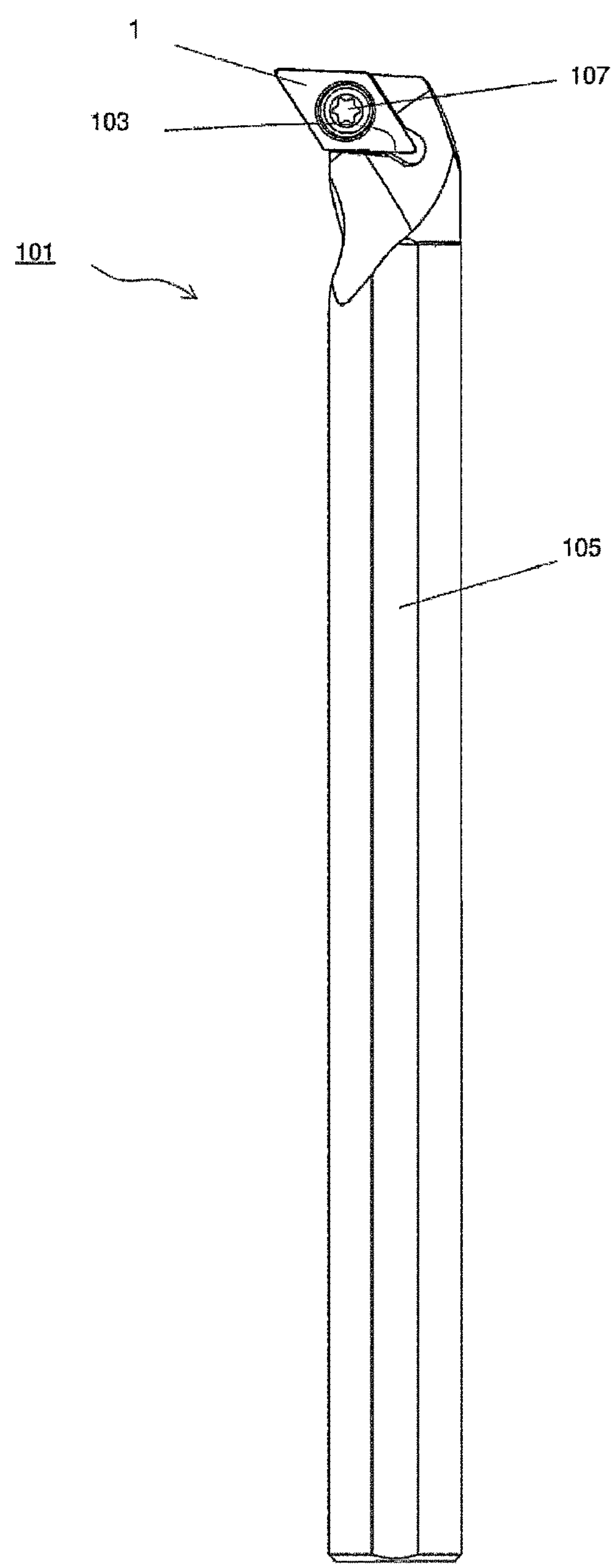
FIG. 3 is a plan view illustrating an example of a cutting tool according to the present disclosure.

As illustrated in FIG. 3, a cutting tool 101 according to the embodiment is, for example, a rod shape body extending from a first end (an upper end in FIG. 3) to a second end (a lower end in FIG. 3). As illustrated in FIG. 3, the cutting tool 101 is provided with a holder 105 and above-described insert 1. The holder 105 includes a pocket 103 on a first end side (leading end side) thereof. The insert 1 is located on the pocket 103.

The pocket 103 is a portion to which the insert 1 is mounted and includes a seating face, which is parallel to a lower surface of the holder 105, and a binding side face, which is inclined with respect to the seating face. The pocket 103 is opened on the first end side of the holder 105.

The insert 1 is positioned in the pocket 103. At this time, the lower surface of the insert 1 may directly contact the pocket 103, and a sheet (not illustrated) may be sandwiched between the insert 1 and the pocket 103.

The insert 1 is mounted on the holder 105 in such manner that at least a part of a portion used as the cutting edge 13 on the ridge line where the rake face and the flank face intersect, protrudes outward from the holder 105. In the present embodiment, the insert 1 is mounted on the holder 105 using a fixing screw 107. That is, the fixing screw 107 is inserted into the through hole 15 of the insert 1, and a leading end of this fixing screw 107 is inserted into a screw hole (not illustrated) formed in the pocket 103, thus screwing thread portions to each other. Thus, the insert 1 is attached to the holder 105.

As a material of the holder 105, steel or cast iron can be used. Steel with high toughness may be used among these members.

In the present embodiment, a cutting tool 101 used in so-called turning processing is exemplified. Examples of the turning processing include boring, outer diameter processing, groove-forming, and end surface processing. Note that, the cutting tool 101 is not limited to those used in the turning processing. For example, the insert 1 according to the above-described embodiment may be used as the cutting tool 101 used in milling processing.

EXAMPLES

The insert according to the present disclosure will be described below.

A TiCN powder subjected to the grinding step was used as the raw material powder. The TiCN powder not subjected to the grinding step was used. In the sample No. 10, shown in Table 1, the TiCN powder not subjected to the grinding step was used. In all other samples, the TiCN powder subjected to the grinding step was used.

(f) Step of holding for 1.0 hour at the temperature T2

(g) Step of changing the pressure in the firing furnace to a pressure P3 shown in Table 1, and then raising the temperature from the temperature T2 to a temperature T3 that is 1500° C. at a rate of temperature rise r3 that is 5.0° C./min (h) Step of holding for 0.5 hour at the temperature T3

(i) Step of changing to an Ar gas atmosphere at a pressure P4 that is 500000 Pa while lowering the temperature from the temperature T3 to a temperature T4 that is 100° C. or less at a rate of temperature decline r4 that is 30.0° C./min

TABLE 1

| Sample No. | Amount of C at the time of blending (mass %) | P1 (Pa) | P2 (Pa) | P3 (Pa) | Total amount of metal element (mass %) | W (mass %) | Nb (mass %) | V (mass %) | K1C (MPa · $m^{0.5}$) | Hardness (HV) | Number of times impacted (times) |
|---|---|---|---|---|---|---|---|---|---|---|---|
| 1 | 7.0 | 10 | 10 | 10 | 4.0 | 2.5 | 1.0 | 0.5 | 7.0 | 1427 | 1992 |
| 2 | 7.0 | 4000 | 3000 | 2000 | 6.5 | 3.0 | 3.5 | 0.0 | 8.0 | 1523 | 3891 |
| 3 | 7.0 | 3000 | 2000 | 1000 | 9.5 | 5.5 | 3.0 | 1.0 | 10.0 | 1492 | 5801 |
| 4 | 7.0 | 2000 | 1000 | 500 | 10.0 | 5.0 | 4.0 | 1.0 | 10.8 | 1479 | 6233 |
| 5 | 7.0 | 1000 | 500 | 100 | 12.0 | 6.0 | 5.0 | 1.0 | 11.0 | 1450 | 6667 |
| 6 | 6.7 | 1000 | 500 | 100 | 15.0 | 7.0 | 6.0 | 2.0 | 11.4 | 1431 | 7004 |
| 7 | 7.5 | 1000 | 500 | 100 | 11.5 | 6.0 | 4.5 | 1.0 | 10.9 | 1466 | 6387 |
| 8 | 8.0 | 1000 | 500 | 100 | 3.0 | 1.5 | 1.5 | 0.0 | 9.8 | 1409 | 1508 |
| 9 | 6.1 | 1000 | 500 | 100 | 7.0 | 3.5 | 3.5 | 0.0 | 8.4 | 1588 | 4012 |
| 10 | 7.0 | 1000 | 500 | 100 | 1.5 | 1.0 | 0.5 | 0.0 | 6.9 | 1502 | 1021 |

In the composition, the TiCN powder was 50.0 mass %, the NbC powder was 8.5 mass %, the VC powder was 2.5 mass %, and the WC powder was 21.0 mass %. Based on this composition, carbon black was added or a part of the WC powder was replaced with the W powder to adjust an amount of C at the time of blending as shown in Table 1 such that the amount of C shown in Table 1 is obtained. That is, blending compositions from the samples No. 1 to No. 10 shown in Table 1 differ in the amount of C, but the other compositions are the same.

After a binder was added to the raw material powder containing the other unavoidable carbide, the raw material powder was shaped into a desired shape by press molding, and thus a powder compact having a tool shape was produced.

Specifically, the raw material powder was molded into a shape of the CNMG120408. Note that, in the molding, a binder may be added to the raw material powder to produce granules having an average particle size from 10 μm to 200 μm by a method such as a spray dryer, and the powder compact having a predetermined shape may be produced by a known molding method such as press molding, extrusion molding, and injection molding. Thereafter, for example, firing was performed by the following steps.

(a) Step of raising the temperature from room temperature to 1100° C. in vacuum (b) Step of holding at 1100° C. for 2.0 hours in vacuum (c) Step of introducing $N_2$ gas in the firing furnace at 1100° C., changing a pressure in the firing furnace to a pressure P1 shown in Table 1, and then raising the temperature from 1100° C. to a temperature T1 that is 1250° C. at a rate of temperature rise r1 of 1.5° C./min (d) Step of holding for 1.5 hours at the temperature T1

(e) Step of changing the pressure in the firing furnace to a pressure P2 shown in Table 1 at the temperature T1, and then raising the temperature from the temperature T1 to a temperature T2 that is 1400° C. at a rate of temperature rise r2 of 3.0° C./min The produced insert was placed in the pocket of the holder, the fixing screw was inserted into the through hole of the insert, and the insert was fixed with this fixing screw. The cutting test was then performed under the following conditions.

Fracture Resistance Testing

Workpiece: SCM435 with four grooves (5 mm width)

Cutting Speed: 200 m/min

Feed: 0.3 mm/rev

Depth of Cut: 0.5 mm

Cutting state: Wet

Evaluation method: Determined by the number of impacts at the time of the occurrence of chipping or defects.

The cross-section of the cermet was observed using TEM, and the presence of the second region was confirmed. The composition of the second region was then measured by EDS. Table 1 shows the total amount of the metal elements in each sample and the content of each metal element. The composition of the second region was measured in a region at a depth from 3 μm to 10 μm from the surface of the cermet.

Fracture toughness and Vickers hardness of each sample were measured at a depth of approximately 500 μm from the surface of the cermet and shown in Table 1. A fracture toughness value may be measured in accordance with JIS R 1607 (1995). The Vickers hardness may be measured in accordance with JIS R 1610 (2003). Note that a pushing load at the time of measuring the Vickers hardness was a load of 196 N.

In the sample No. 10 using the TiCN powder not subjected to the grinding step, the second region was hardly present, the fracture toughness value was low, and fracture resistance was low.

In every sample using the TiCN powder subjected to the grinding step, the second region was confirmed. In the samples No. 1, 2, 8, and 9, the second region was present, while the total amount of the metal elements was below 9.5 mass %, and fracture resistance was low.

On the other hand, the samples No. 3 to No. 7, which were produced using the TiCN powder subjected to the grinding step and the total amount of the contents of one or more metal elements selected from the group consisting of V, Nb, Ta, Cr, Mo, W, Co, and Ni in the second region was 9.5 mass % or more, were superior in fracture resistance. The higher the total amount of the one or more metal elements in the second region, the higher fracture resistance.

The insert of the present disclosure and the cutting tool provided therewith described above are examples, and may have different configurations unless departing from the spirit of the present application.

REFERENCE SIGNS

1 Insert
3 Base
5 First surface
7 Second surface
11 Ridge line
13 Cutting edge
15 Through hole
21 Hard particle
21*a* First region
21*b* Second region
101 Cutting tool
103 Pocket
105 Holder
107 Fixing screw

The invention claimed is:

1. An insert, comprising:

a cermet as a base, the cermet including a plurality of hard particles, and a bonded phase located between the plurality of hard particles, the bonded phase containing 50.0 mass % or more of an iron group metal, wherein each of the plurality of hard particles, when viewed in cross section, comprises a first region containing Ti, N, and C and containing 50.0 mass % or more of a titanium carbonitride phase, and a second region containing one or more metal elements selected from the group consisting of V, Nb, Ta, Cr, Mo, W, Co, and Ni in a larger amount than the first region, a total amount of a content of the one or more metal elements in the second region is 9.5 mass % or more, and the second region contains 1.0 mass % or more of V.

2. The insert according to claim 1, wherein the second region contains 2.5 mass % or more of Nb.

3. The insert according to claim 1, wherein the cermet contains 14.0 mass % or more and 22.0 mass % or less of Ni and Co in a total amount.

4. The insert according to claim 1, wherein the cermet has fracture toughness of 10.0 MPa·m0.5 or more.

5. The insert according to claim 1, wherein the cermet has Vickers hardness of HV1400 or more.

6. A cutting tool having a length extending from a first end to a second end, the cutting tool comprising:

a holder comprising a pocket located closer to a first end side; and an insert located in the pocket, wherein the insert comprises a cermet as a base, the cermet includes a plurality of hard particles, and a bonded phase located between the plurality of hard particles, the bonded phase containing 50.0 mass % or more of an iron group metal, wherein each of the plurality of hard particles, when viewed in cross section, comprises a first region containing Ti, N, and C and containing 50.0 mass % or more of a titanium carbonitride phase, and a second region containing one or more metal elements selected from the group consisting of V, Nb, Ta, Cr, Mo, W, Co, and Ni in a larger amount than the first region, a total amount of a content of the one or more metal elements in the second region is 9.5 mass % or more, and the second region contains 1.0 mass % or more of V.

7. The insert according to claim 1, wherein each of the plurality of hard particles contains 50.0 mass % or more of titanium carbonitride.

8. The insert according to claim 1, wherein the first region is a matrix part of the each of the plurality of hard particles.

9. The insert according to claim 1, wherein the second region is a wire shape or a mesh shape when viewed in cross section of the each of the plurality of hard particles.

10. An insert, comprising:

a cermet as a base, the cermet including a plurality of hard particles, and a bonded phase located between the plurality of hard particles, the bonded phase containing 50.0 mass % or more of an iron group metal, wherein each of the plurality of hard particles, when viewed in cross section, comprises a first region containing Ti, N, and C and containing 50.0 mass % or more of a titanium carbonitride phase, and a second region containing one or more metal elements selected from the group consisting of V, Nb, Ta, Cr, Mo, W, Co, and Ni in a larger amount than the first region, a total amount of a content of the one or more metal elements in the second region is 9.5 mass % or more, and the second region contains 2.5 mass % or more of Nb.

11. The insert according to claim 10, wherein the second region contains 1.0 mass % or more of V.

12. The insert according to claim 10, wherein each of the plurality of hard particles contains 50.0 mass % or more of titanium carbonitride.

13. The insert according to claim 10, wherein the first region is a matrix part of the each of the plurality of hard particles.

14. The insert according to claim 10, wherein the second region is a wire shape or a mesh shape when viewed in cross section of the each of the plurality of hard particles.

* * * * *